United States Patent
Findlay et al.

(10) Patent No.: US 10,250,947 B2
(45) Date of Patent: *Apr. 2, 2019

(54) MEETING SYSTEM THAT INTERCONNECTS GROUP AND PERSONAL DEVICES ACROSS A NETWORK

(75) Inventors: Roland Findlay, San Jose, CA (US); Ronald Marc Conescu, Mountain View, CA (US); Eugene Limb, Palo Alto, CA (US); Haixia Yu, San Jose, CA (US); Jay Dautcher, Santa Cruz, CA (US); Elena Grostrer, Sunnyvale, CA (US); Michael Griffin, Redwood City, CA (US); Yuko Ihara, San Mateo, CA (US)

(73) Assignee: Ricoh Company, Ltd., Tokyo (JP)

( * ) Notice: Subject to any disclaimer, the term of this patent is extended or adjusted under 35 U.S.C. 154(b) by 348 days.

This patent is subject to a terminal disclaimer.

(21) Appl. No.: 13/412,443

(22) Filed: Mar. 5, 2012

(65) Prior Publication Data

US 2013/0086166 A1    Apr. 4, 2013

Related U.S. Application Data

(63) Continuation of application No. 13/411,259, filed on Mar. 2, 2012, now Pat. No. 9,948,988.

(Continued)

(51) Int. Cl.
*G06F 15/16* (2006.01)
*H04N 21/4788* (2011.01)
(Continued)

(52) U.S. Cl.
CPC ..... *H04N 21/4788* (2013.01); *G06F 3/04883* (2013.01); *G06F 17/241* (2013.01);
(Continued)

(58) Field of Classification Search
CPC .............. G06Q 10/103; H04L 12/1831; H04L 12/1827; H04L 29/06401; H04L 65/4015
(Continued)

(56) References Cited

U.S. PATENT DOCUMENTS

| | | |
|---|---|---|
| 5,745,711 A | 4/1998 | Kitahara et al. |
| 5,938,724 A | 8/1999 | Pommier et al. |

(Continued)

FOREIGN PATENT DOCUMENTS

| | | |
|---|---|---|
| JP | 2006416629 A1 | 8/2006 |
| JP | 2009230579 A1 | 8/2009 |

OTHER PUBLICATIONS

EBeam engage by Luidia, 2011 Lidia, Inc all right reserve www.e-beam.com.

*Primary Examiner* — Hitesh Patel
(74) *Attorney, Agent, or Firm* — Duft & Bornsen, PC (57) ABSTRACT

Systems and methods are provided for hosting collaboration between multiple clients. The system includes a network interface able to communicate with clients, and a control unit. The control unit is able to receive a screen capture that represents visual content at a display of a client, to identify multiple clients for receiving the screen capture, and to transmit the screen capture to the multiple clients for presentation at displays of the multiple clients. The control unit is further able to receive instructions in parallel from the multiple clients representing marks made upon the screen capture, and to transmit the instructions in parallel to the multiple clients to apply the marks onto the screen capture as presented at the displays of the multiple clients.

20 Claims, 8 Drawing Sheets

Related U.S. Application Data (60) Provisional application No. 61/543,072, filed on Oct. 4, 2011.

(51) Int. Cl.
    *G06F 3/0488* (2013.01)
    *G06F 17/24* (2006.01)
    *H04N 7/15* (2006.01)
    G06F 3/14 (2006.01)
    H04N 21/472 (2011.01)
    H04N 21/81 (2011.01)
    G06Q 10/10 (2012.01)

(52) U.S. Cl.
    CPC ............ *H04N 7/15* (2013.01); *G06F 3/1454* (2013.01); *G06Q 10/10* (2013.01); *H04N 21/47205* (2013.01); *H04N 21/8146* (2013.01)

(58) Field of Classification Search
    USPC .................... 709/204, 206; 715/255, 753
    See application file for complete search history.

(56) References Cited

U.S. PATENT DOCUMENTS

| | | | |
|---|---|---|---|
| 5,995,096 A | 11/1999 | Kitahara et al. | |
| 6,342,906 B1 | 1/2002 | Kumar et al. | |
| 6,343,313 B1 | 1/2002 | Salesky et al. | |
| 6,463,460 B1 | 10/2002 | Simonoff | |
| 7,043,529 B1 | 5/2006 | Simonoff | |
| 7,213,051 B2 | 5/2007 | Zhu et al. | |
| 7,225,402 B2 | 5/2007 | Silverbrook et al. | |
| 7,290,210 B2 | 10/2007 | Silverbrook et al. | |
| 7,369,515 B2 | 5/2008 | Salesky et al. | |
| 7,370,269 B1 | 5/2008 | Prabhu et al. | |
| 7,391,910 B2 | 6/2008 | Ratnakar et al. | |
| 7,421,069 B2 | 9/2008 | Vernon et al. | |
| 7,433,327 B2 | 10/2008 | Harville et al. | |
| 7,434,166 B2 | 10/2008 | Acharya et al. | |
| 7,516,179 B2 | 4/2009 | Huck et al. | |
| 7,516,579 B2 | 4/2009 | Kreyenborg et al. | |
| 7,634,540 B2 | 12/2009 | Ivashin et al. | |
| 7,707,251 B2 | 4/2010 | Birch | |
| 7,716,273 B2 | 5/2010 | Soin et al. | |
| 7,716,344 B2 | 5/2010 | Salesky et al. | |
| 7,761,510 B2 | 7/2010 | Watanabe et al. | |
| 7,813,304 B2 | 10/2010 | Salesky et al. | |
| 7,814,559 B2 | 10/2010 | Horikiri | |
| 7,840,596 B2 | 11/2010 | Geyer et al. | |
| 7,856,473 B2 | 12/2010 | Horikiri et al. | |
| 7,880,719 B2 | 2/2011 | Kritt et al. | |
| 7,934,002 B2 | 4/2011 | Salesky et al. | |
| 7,945,622 B1 | 5/2011 | Pegg | |
| 7,962,525 B2 | 6/2011 | Kansal | |
| 8,275,197 B2 | 9/2012 | Hawkins et al. | |
| 8,661,331 B2 | 2/2014 | Martin et al. | |
| 8,806,354 B1 | 8/2014 | Hyndman et al. | |
| 8,862,731 B2 | 10/2014 | Leung et al. | |
| 2002/0116399 A1 | 8/2002 | Camps et al. | |
| 2003/0028637 A1 | 2/2003 | Gross | |
| 2003/0105816 A1* | 6/2003 | Goswami | 709/204 |
| 2003/0218597 A1 | 11/2003 | Hodzic et al. | |
| 2004/0165768 A1 | 8/2004 | Zhang et al. | |
| 2004/0189700 A1 | 9/2004 | Mandavilli et al. | |
| 2004/0194021 A1 | 9/2004 | Marshall et al. | |
| 2006/0206564 A1 | 9/2006 | Burns et al. | |
| 2007/0022159 A1 | 1/2007 | Zhu et al. | |
| 2007/0198744 A1 | 8/2007 | Wensley et al. | |
| 2008/0183820 A1 | 7/2008 | Golovchinsky et al. | |
| 2009/0193327 A1 | 7/2009 | Roychoudhuri et al. | |
| 2010/0017727 A1 | 1/2010 | Offer et al. | |
| 2010/0083136 A1* | 4/2010 | Komine et al. | 715/753 |
| 2010/0192072 A1 | 7/2010 | Spataro et al. | |
| 2010/0251142 A1 | 9/2010 | Geppert et al. | |
| 2010/0261466 A1 | 10/2010 | Chang et al. | |
| 2010/0281362 A1* | 11/2010 | Bailor et al. | 715/256 |
| 2010/0306018 A1 | 12/2010 | Burtner et al. | |
| 2011/0078236 A1 | 3/2011 | Olsen et al. | |
| 2011/0107246 A1* | 5/2011 | Vik | 715/771 |
| 2011/0113326 A1* | 5/2011 | Baer | 715/255 |
| 2011/0126127 A1 | 5/2011 | Mariotti et al. | |
| 2011/0191334 A1* | 8/2011 | Hua et al. | 707/726 |
| 2011/0239133 A1 | 9/2011 | Duffus et al. | |
| 2011/0252339 A1 | 10/2011 | Lemonik et al. | |
| 2012/0079399 A1 | 3/2012 | Ferman et al. | |
| 2014/0164776 A1* | 6/2014 | Hook | H04L 9/14 713/171 |

* cited by examiner

MEETING SYSTEM THAT INTERCONNECTS GROUP AND PERSONAL DEVICES ACROSS A NETWORK

RELATED APPLICATIONS

This non-provisional application is a continuation of U.S. provisional patent application Ser. No. 13/411,259, filed on Mar. 2, 2012 now U.S. Pat. No. 9,948,988 which claims priority to U.S. provisional patent application No. 61/543,072, filed on Oct. 4, 2011 and titled "MEETING SYSTEM THAT INTERCONNECTS GROUP AND PERSONAL DEVICES ACROSS A NETWORK," which is hereby incorporated by reference.

FIELD OF THE INVENTION

The invention relates to the field of presentation devices for meetings, and in particular, to collaborative presentation systems that enable user interaction with a presentation.

BACKGROUND

In creative workplaces, meetings between teams of individuals are often utilized in order to enhance collaboration and generate new ideas. In particular, collaborative meetings are desirable because they allow multiple individuals to generate, "on the fly," new ideas stemming from the ideas of other attendees. In order to streamline the creative process, it is desirable that the technology used to conduct such collaborative meetings be streamlined, intuitive, and flexible. In this manner, the technology should provide a conduit for creativity and not an obstacle to it.

Being able to collaborate visually is unfortunately problematic in current meeting systems. Existing tools or devices such as projectors and whiteboards may be cumbersome, and they may be incapable of allowing multiple attendees to share, point, and draw at the same time in order to provide collaborative input. Furthermore, static devices such as projection screens and whiteboards do not allow for collaboration between attendees who are not present at the same location.

These problems are even further amplified in the context of a global workforce, where individuals of a team are often separated by thousands of miles. In these circumstances, if the technology used for the meeting is inconvenient, it can stifle the flow of creative ideas. While various technologies (e.g., WebEx brand meeting systems, online whiteboards, etc.) are available to facilitate remote collaboration, they are often frustrating in that they lack features desired for streamlining the process by which a collaborative meeting is performed.

Thus, meeting attendees continue to desire systems that streamline the presentation process and also enhance collaboration between individuals, particularly between remote attendees.

SUMMARY

Embodiments described herein advantageously streamline meetings between remote individuals by providing an enhanced server that is accessible via a network. During a meeting, attendees may share screen captures of their clients with the server for distribution to others. The attendees may then, in parallel, mark/draw on the shared screen capture using their clients, and these marks are shared with others via the server. Thus, the server allows attendees to collaborate in real time to present their screens and collaborate based on those screens.

One embodiment is a system for hosting collaboration between multiple clients. The system has a server, which includes a network interface able to communicate with clients, and a control unit. The control unit is able to receive a screen capture that represents visual content at a display of a client, to identify multiple clients for receiving the screen capture, and to transmit the screen capture to the multiple clients for presentation at displays of the multiple clients. The control unit is further able to receive instructions in parallel from the multiple clients representing marks made upon the screen capture, and to transmit the instructions in parallel to the multiple clients to apply the marks onto the screen capture as presented at the displays of the multiple clients.

Another embodiment is a further system for hosting collaboration between multiple clients. The system includes a server and clients able to communicate with the server via a network. Each client is further able to provide a screen capture that represents visual content at a display of the client. The server is able to identify multiple clients for receiving the screen capture and to transmit the screen capture to the multiple clients for presentation at displays of the multiple clients. Each client is still further able to update its display to present the screen capture to a user, to receive marks applied by the user upon the screen capture, to generate instructions representing the marks made upon the screen capture, and to transmit the instructions to the server. The server is still further able to receive the instructions in parallel from the multiple clients, and to transmit the instructions in parallel to the multiple clients to apply the marks onto the screen capture as presented at the displays of the multiple clients.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

System Overview

Figure 1:
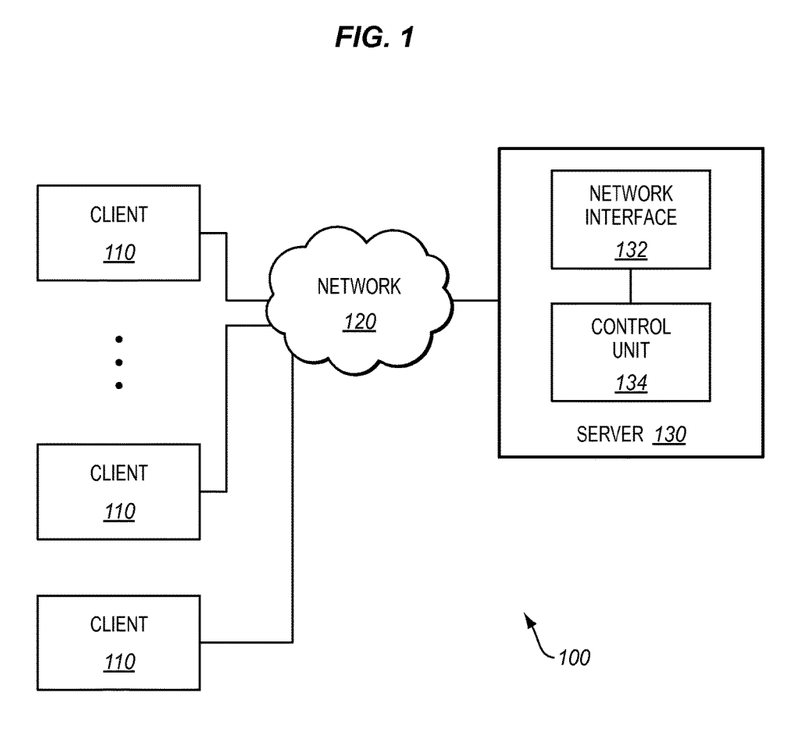
FIG. 1 is a block diagram of a server coupled with multiple clients via a network in an exemplary embodiment.

FIG. 1 is a block diagram of a server 130 coupled with multiple clients 110 via a network 120 in an exemplary embodiment. Utilizing server 130, each client 110 may share a screen capture (i.e., a representation of the current image shown on a physical display or a portion thereof) with other clients 110. Furthermore, upon acquiring a shared screen capture, the multiple clients 110 may mark (e.g., type/draw) onto the shared screen capture in parallel, and these marks are distributed (e.g., separately from the screen captures themselves) in parallel to the other clients 110. This in turn allows the multiple clients 110 to engage in a collaborative process simultaneously.

Clients 110 comprise any systems, devices, or components operable to present visual content to a user via a display (e.g., a monitor, television, smartphone, etc.), to share that visual content with other clients 110 via server 130, and to receive visual content from server 130 for display. Clients 110 are capable of communicating with server 130 via network 120. In particular, each client 110 is operable to provide screen captures (i.e., at least some portion of the pixels displayed to a user of the client 110 via a physical display device) to server 130. In this embodiment, each client 110 comprises a processor and memory for transmitting screen captures to server 130. Further, each client 110 is operable to process markup instructions received by server 130. Clients 110 may comprise laptops, desktop computers, tablet devices, smart phones, etc. In further exemplary embodiments, clients 110 may utilize displays capable of presenting visual content to an entire group of individuals. Such displays include projectors, flat panel displays having touch-sensitive screens, interactive whiteboards, smart televisions, etc. Clients 110 will typically include interfaces for communicating with network 120, although in some embodiments, an adapter or other component may be used to couple a client 110 with network 120. Each client 110 may be physically located anywhere, as long as network 120 is accessible.

Network 120 comprises any systems or devices capable of implementing a packet-switched network. In particular, network 120 is operable to carry communications between server 130 and various clients 110 utilizing a transport layer protocol. For example, network 120 may comprise a number of routers, switches, servers, hubs, and/or other devices compatible with a packet-switched networking protocol (e.g., TCP/IP, IEEE 802.11 protocols for wireless networking, Local Area Network (LAN) protocols such as IEEE 802.3, etc.). In a further example, network 120 may comprise an internal intranet of a company or may comprise the global Internet itself.

Server 130 comprises any system, component, or device operable to manage a meeting between multiple clients 110. For example, server 130 may comprise a processor and memory for managing clients 110. Server 130 is operable to receive screen captures (representing visual content at a display of a client 110) and instructions (for marking on a given screen) from clients 110 in parallel. These instructions are received via network Interface (I/F) 132. Multiple clients 110 may substantially simultaneously, via network I/F 132, provide instructions to server 130 for distribution to other clients 110. Control unit 134 may process the markup instructions to determine their source, and may further transmit each markup instruction to clients 110 that did not provide the instruction (so that those clients 110 may update their displays appropriately). Thus, utilizing server 130, multiple clients 110 may collaborate, in parallel, to mark up a screen that has been shared. Server 130 may be located anywhere (e.g., on the Internet, in a network cloud, local to a client 110, etc.) but is accessible via network 120. Further, server 130 may be operable to manage multiple meetings, either simultaneously or at separate times.

Further details of the operation of server 130 will be discussed below with regard to FIG. 2. Assume, for this embodiment, that server 130 has been set up to operate on network 120. Further, assume that a client 110 requests that server 130 generate a meeting. Server 130 creates the meeting, and adds the client 110 to the meeting. A new client 110 contacts server 130 via network 120 and elects to join the meeting. Server 130 then adds the new client 110 to the meeting and provides the new client 110 with an undo/redo "state" of the meeting (discussed below) from which the new client 110 may determine the current state of the meeting.

System Connections

During a meeting, each client 110 may maintain multiple connections with server 130. Each connection may accept communications in both an outgoing direction and an incoming direction. For example, there may be several kinds of connections, each utilizing a different protocol. These connections may be either synchronous or asynchronous.

Synchronous connections allow a client 110 to send commands to server 130 and receive responses from server 130 for each command. For example, in one embodiment a client 110 uses a connection to send a "start meeting" command to server 130 with a number of parameters (e.g., a desired meeting name, a passcode used to join the meeting, etc.). The client 110 then waits for server 130 to respond with the meeting's assigned name and a unique identifier for the meeting. Upon receiving this information, the client 110 then uses the unique meeting identifier when submitting further commands.

For asynchronous connections, messages between clients 110 and server 130 are independent of each other, such that a client 110 may send messages to server 130 in one direction while server 130 sends independent messages to the client 110 at the same time. For example, a client 110 may provide a screen capture to server 130. Server 130 provides the screen capture to other clients 110 in the same meeting. When a client 110 marks upon the shared screen capture, instructions for the mark are sent to server 130, and server 130 distributes these instructions in parallel to other clients 110 in the same meeting. Using the asynchronous connection, these instructions may be received by a client 110 even as the client 110 is transmitting its own instructions to server 130 for distribution.

Server 130 is capable of receiving instructions for applying marks in parallel from the participating clients 110, and distributing the instructions in parallel to the other participating clients 110 attending the meeting. Participating clients 110 may then engage in collaboration to mark up shared screen captures in parallel.

Exemplary Meeting Method

Figure 2:
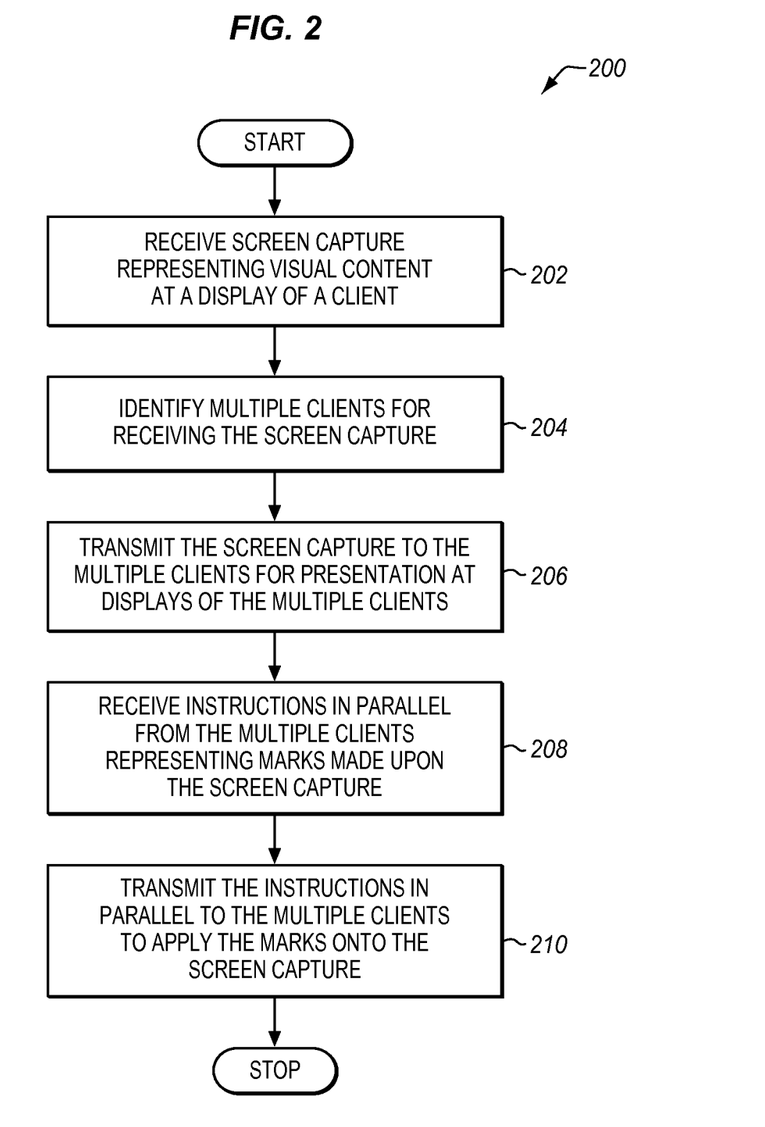
FIG. 2 is a flowchart illustrating a method for provisioning a meeting in an exemplary embodiment.

FIG. 2 is a flowchart illustrating a method for provisioning a meeting in an exemplary embodiment. The steps of method 200 are described with reference to server 130 of FIG. 1, but those skilled in the art will appreciate that method 200 may be performed in other systems. The steps of the flowcharts described herein are not all inclusive and may include other steps not shown. The steps described herein may also be performed in an alternative order.

Client Screen Capture

In step 202, server 130 receives a screen capture from a client that represents visual content at a display of the client (i.e., at least some portion of the pixels displayed to a user of the client via a display device of the client). Screen captures are discussed in more detail below with regard to FIG. 3. A screen capture of the client differs from a mere "whiteboard" or other blank space because it depicts more than an empty region—it depicts a portion of the client's display as it would appear if no meeting were taking place. For example, a screen capture includes windows, backgrounds, documents, user interfaces for the operating system of the client, and/or other items shown on the desktop work area. In contrast, a whiteboard would replace desktop content with a blank space for the meeting. Desktop content therefore would not be shared.

The received screen capture may represent the entire screen of the client, a scaled version of a screen of the client, a portion of the screen of the client, a window of the client, etc. Further, this image data may be transmitted to server 130 as uncompressed image data (e.g., a PNG file) or compressed image data (e.g., a JPEG file), and may be downscaled by the client. Upon receiving the screen capture, server 130 may store a copy of the screen capture in memory.

Shared Screen Capture Distribution

In step 204, server 130 identifies multiple clients for receiving the screen capture. For example, server 130 may maintain a list of clients currently attending the meeting. When a screen capture is received from one client, server 130 is operable to determine which other clients are attending the meeting and select those other clients for receiving the screen capture.

In step 206, server 130 transmits the received screen capture to the multiple clients for presentation of the screen capture at displays of those clients. The screen capture may be provided by server 130 to each client, for example, via a vendor specific application layer protocol that sits atop a TCP/IP or other transport layer protocol communication. In some embodiments, the screen capture may be accompanied by other information. This other information may identify a meeting that the screen capture relates to, for example, the meeting may be identified by name or number. The other information may further identify the client that provided the screen capture to server 130. In one embodiment each client may be indicated by a unique identifier. The other information may also include instructions for removing a previously presented screen capture, as well as removing marks previously applied to the previously presented screen.

Each client, upon receiving the shared screen capture, is operable to update a physical display for a user. For example, each client may replace/update a portion of their display reserved for the meeting so that the portion of the display includes the screen capture. In some embodiments, the screen capture may be presented at the display of a client with an altered opacity, and may be scaled, rotated, skewed, positioned or otherwise modified.

Shared Screen Capture Markup and Drawing Tools

Upon viewing the shared screen capture at a display of a client, a user of the client may use drawing/typing tools to mark upon the shared screen capture in order to share their commentary and/or feedback with other users. For example, the user may draw a line onto the shared screen capture to draw attention to a portion of a chart. The client may interpret the marks made by the user, and then generate instructions (representing the marks) that can be distributed by server 130 for sharing with other clients. The markup instructions may describe shapes, text, symbols, etc. In one embodiment, the instructions are sent as strokes to server 130. Initiation of a stroke may be triggered, for example, by a user activating pointing input (e.g., by depressing a mouse button, touching something with a stylus or finger, etc.) indicating a location on the shared screen capture. Upon detection of the pointing input, the client transmits information to server 130 indicating the size of the shared screen capture (e.g., in pixels) as it is shown at the client's display, as well as the starting location of the pointing input. As the cursor moves across the screen, the client may continue to transmit a stream of coordinates indicating a location of the cursor. This process may continue until the pointing input has terminated, at which time the client indicates that the stroke has been completed. This stroke information may further describe a color, a width, opacity, the client that originated the mark, and other parameters describing the mark.

The clients may then provide the generated instructions in parallel to server 130 for distribution to other clients. In one embodiment, server 130 maintains communications with clients 110 such that instructions representing the markup may be received from and transmitted to multiple clients both asynchronously and in parallel.

Screen Markup Distribution

In step 208, server 130 receives the instructions representing the markup from multiple clients in parallel. Server 130 may further process the instructions received from the multiple clients in parallel. For example, processing the instructions may include storing them in memory as part of an undo/redo "state" from which the state of the meeting can be regenerated. In one embodiment, the undo/redo state includes the current state of an undo stack and a redo stack, the details of which are described below. For example, the undo/redo state may include entries that describe shared screen captures, instructions for marks related to each screen, etc. In this manner, when a new client joins the meeting, server 130 may transmit the undo/redo state of screen captures and marks to the new client. The new client may then identify the most recent screen capture (i.e., a screen capture that has yet to be replaced by another screen capture) and then apply the instructions for marking up the shared screen capture one at a time in order to create the image as it already appears at the other clients.

Server 130 may further process the instructions in order to facilitate transmitting the instructions to other clients. For example, when transmitting the instructions, server 130 may indicate the client which originated the markup instructions. Thus, if a client is receiving multiple streams of stroke data at once from server 130, the receiving client can determine which clients originated each stream of stroke data.

In step 210, server 130 transmits the instructions to the multiple clients. For each markup instruction received from a client, the markup instruction is sent out to the other clients attending the meeting. In this sense, changes at any one client are broadcast to the other clients. In the case of markup instructions that describe strokes, server 130 may transmit portions of strokes at a time, or may transmit entire strokes at once. For example, portions of strokes may be sent while the stroke is being drawn initially, but complete strokes may be sent when a client is being provided the undo/redo state upon joining a meeting. Because strokes are drawn over a period of time, it may be desirable to transmit the stroke data continuously from server 130 in order to provide real-time updates to the clients. Thus, server 130 may update multiple clients with information regarding multiple in-progress strokes at the same time.

Upon receiving the instructions, the clients are operable to apply the instructed marks onto the shared screen capture. Thus, in one embodiment, the server does not do the processing intensive work of rendering an image for presentation at a display, but rather the clients render the markup and screen captures together into a final image. This saves bandwidth at the network and also speeds up the process by which the shared screen capture is updated at clients. Thus, any markup applied to the shared screen capture by any client is quickly shared, via server 130, across the other clients.

The steps of method 200 may be performed asynchronously between clients, and may be performed in parallel by server 130. Thus, server 130 may receive and transmit multiple sets of markup instructions for altering a shared screen capture substantially simultaneously. This in turn allows an enhanced level of collaboration between meeting attendees, because they may collaborate all together at once without having to pass ownership of the meeting between presenters.

Eraser Tool

In a further embodiment, strokes may be erased using an eraser tool. The eraser as applied to a shared screen capture may be described as a stroke. As the erasing stroke is applied, pixels from strokes occupying the same location as the erasing stroke are removed. The visual content of the underlying shared screen capture under the erase stroke is then revealed. Thus, the previous marks appear to be partially or entirely erased by the eraser tool. At the same time, because the erasing action is stored as a stroke, the erasing may be undone or redone as a part of the meeting's undo/redo state.

Digital Pointing Tool

In another embodiment, each user may utilize a digital pointing tool to indicate locations on the shared screen capture, and this digital pointing tool may include a unique identifier for the user currently using the tool. For example, for one user, a pointer may be rendered by the pointing tool as a filled-in translucent circle or dot around the pointer. For another user, the pointer may comprise a different shape, an animated shape, a trail, a different color, etc. This information is sent as pointer information to server 130, which distributes the pointer to other clients attending the meeting. This information may further describe a location for the pointer, color for the pointer, shape for the pointer, size (e.g., diameter) of the pointer, opacity of the pointer, the client that originated the pointer, and other parameters. When the user stops indicating a location at the shared screen capture, the pointer may disappear until the pointing tool is used again.

Layers

In a further embodiment, markup instructions and shared screen captures may occupy layers, where certain layers are overlaid on top of other layers for presentation at a display. Thus, as presented, the topmost layers appear to be drawn upon the lower layers. Using layers, certain marks may overlap (instead of replace) shared screen captures or other shared visual content. Typically, the shared screen capture or white space will occupy a lowest layer. Markup instructions occupy a layer atop the lowest layer (i.e., marks may reside at a layer having graphical content that overlays the lowest layer). Marks that have been more recently drawn than older marks may be drawn over their predecessors in this layer. Pointers may occupy a topmost layer, such that pointing input overlays applied marks without modifying them. Each change to the undo/redo stack and/or change to a pointer causes the appropriate layers to be regenerated.

In a further embodiment, strokes at a client 110 are added to the strokes layer. The strokes layer is first generated by creating a canvas that fills an area the size of a shared screen capture with transparent pixels. As strokes are drawn in time order onto the canvas, each stroke is added to the canvas by interacting with the pixels they pass over. In order to render the strokes together, the strokes may be blended according to well-known alpha composition operations understood by those of ordinary skill in the art. For example, erasing strokes may clear co-located pixels of strokes beneath the erasing stroke, returning the path of the erasing stroke to the background. Similarly, pointer information is added to the pointer layer. The pointers layer is first generated by creating a similar canvas. As recent point information is drawn in time order onto the canvas, the pointer information is added to the canvas by interacting with the pixels they pass over.

Undo/Redo State

In a further embodiment, the undo/redo state may include a series of independent entries, each entry indicating either a piece of visual content or an instruction applied to mark upon the visual content. When new clients enter the meeting, control unit 134 may transmit the meeting's undo/redo state to the new clients. Just like instructions for marks and shared visual content, undo and redo commands received by control unit 134 during the meeting may be distributed to the clients attending the meeting.

Control unit 134 may receive an undo or redo command from a client 110 and add the command to the server's 130 undo/redo state. Control unit 134 may then explicitly instruct clients attending the meeting to undo or redo the specific entry of the undo/redo state. Upon receiving an undo or redo command from server 130, the clients 110 may use their own copies of the undo/redo state to undo or redo a previously applied mark or piece of visual content, even if they were not present when the mark or visual content was applied. As the undo/redo state includes information describing how the instruction was applied in the first place, the entry for the instruction may be used to undo or redo the instruction.

One embodiment of undo/redo state includes two stacks of operations, each of which includes shared screen captures (e.g., backgrounds), strokes (including erasing strokes), and clears. One stack is used for undoing previously performed operations, and the other stack is used to redo previously undone operations. When a client initiates any operation described above, the operation is pushed onto the undo stack and the redo stack is cleared. When a client requests an undo, the most recent entry on the undo stack is popped and the entry is pushed onto the redo stack. When a client requests a redo, the most recent entry on the redo stack is applied to the meeting, and the entry is popped from the redo stack and pushed onto the undo stack. Server 130 broadcasts each undo and redo to attending clients in order to ensure that the meeting's undo/redo state is synchronized between them.

Saving Meeting State

In another embodiment, control unit 134 is operable to save the current state of a meeting in a document format (e.g., PDF, DOC, HTML, etc.). In the document format, the meeting's state may be viewed and/or printed by programs that are not specialized for hosting live meetings between clients (e.g., Adobe Reader, Microsoft Word, web browsers, etc.). To save the meeting's state, the visual content of the meeting as well as any instructions (e.g., for marks) applied to the visual content of the meeting may be saved in the document. Thus, a user viewing the document may see a "snapshot" of the meeting in the state it was at when the meeting was still in session. A new document may be generated by the server 130 for each meeting when the meeting ends. This new document is available for later use.

For example, if the meeting comprised a shared chart and markup applied to the chart, a page of the document could show the appearance of the marked up chart. Saving the state of the meeting in a document format may be triggered at a client or at control unit 134. The document itself will typically be generated at server 130 from which it may be distributed upon request to clients. The document may be separated into multiple portions, and may be arranged in order to allow server 130 to generate a new meeting (that matches the previously saved meeting state in the document) upon reviewing the document. For example the document may include a viewable portion representing an image of the meeting state (i.e., a JPEG, TIF, etc. image of the visual content and the instructions applied to the visual content at the time the document was generated), a thumbnail image of the meeting state, and a metadata portion. The metadata portion may include the visual content in its original form (i.e., unmodified by the applied instructions), and may further include each instruction applied to the visual content, the identity of each client that generated the instructions, time stamps indicating the time at which each instruction was applied, etc. Thus, control unit 134, upon reading the document, may be able to generate the new meeting simply by analyzing the metadata portion of the document, recreating the piece of visual content, and recreating each instruction applied to the visual content. In this manner, the new meeting may be indistinguishable from the old meeting. Control unit 134 may further supply the visual content and each instruction of the document to clients attending the new meeting.

Control unit 134 may further be able to recreate an undo/redo state of undo and redo actions performed in relation to the meeting. Thus, a user could use the document to generate the new meeting as well as to recreate undo/redo actions performed while the previous meeting was in session. This allows for undo and redo actions to be performed upon the new meeting, even if the actions being undone or redone were performed during the previous meeting. In a further embodiment, the meeting state may include a copy of an undo/redo state stored at server 130, wherein the undo/redo state includes each action taken during the meeting up until the snapshot was taken.

Snapshots

In a further embodiment, server 130 may store multiple meeting "snapshots," wherein each meeting snapshot describes the state of the meeting at a point in time. These snapshots may be stored at the document portions or pages described above. Thus, these snapshots include a viewable portion representing an image of the meeting state, a thumbnail of this viewable portion, and metadata. The metadata may include the undo/redo state. The taking of each snapshot by control unit 134 may be initiated based upon any triggering condition, such as the submission of new visual content for marking by a client, a client request, the passage of time, etc. In an embodiment, a client 110 may trigger the server 130 to create a separate document during the meeting. The document may include all snapshots saved for the meeting at that time. The separate document may be delivered to the client 110. In one example, a first snapshot may include a picture and/or thumbnail image indicating the state of the meeting after one hour of collaboration, the second snapshot may indicate the state of the meeting after two hours, etc. Users of the meeting may then switch between snapshots even during the meeting to present different stages of the meeting. This may be desirable, for example, when a first stage of the meeting was spent discussing a first chart, a second stage of the meeting spent discussing a second chart, and so on. If a snapshot is selected by a user and presented during a meeting, the current undo/redo state of the meeting is saved, and the saved undo/redo state associated with the snapshot replaces it. The snapshot is thus incorporated into the meeting. As the meeting progresses, users may continue to mark up the shared screen.

Each snapshot may be saved as a separate page within the document. When the document is generated, each snapshot may be located on its own page, and metadata in the document may be associated with each snapshot as well, such that each individual snapshot and its related undo/redo state may be recreated when the saved meeting state is recreated (i.e., the saved meeting state's undo/redo state replaces the current undo/redo state of the meeting, and the current undo/redo state of the meeting is saved before it is replaced). This allows each individual snapshot to include its own undo and redo state of actions when recreated. Furthermore, as presented in the document, the snapshots quickly and efficiently tell a story of the meeting's progress. This therefore obviates the need for a meeting attendee to maintain and update a set of notes describing the meeting's progress.

In a still further embodiment, a user wishing to recreate a saved meeting state may load the document, at which time the user may be presented with a list of thumbnails of the saved meeting states stored within the document. As the meeting progresses, the user may then select one or more specific saved meeting states to append to the new meeting. In another embodiment, the user is presented with a list of thumbnails from a number of meetings associated with a number of documents. A similar process may be undertaken to load multiple snapshots from multiple documents. In another embodiment, one or more users can append to the current meeting one or more snapshots from one or more meetings.

EXAMPLES

In the following examples, additional processes, systems, and methods are described in the context of enhancing collaboration for marking up a screen using multiple clients operating in parallel.

Client Screen Capture

Figure 3:
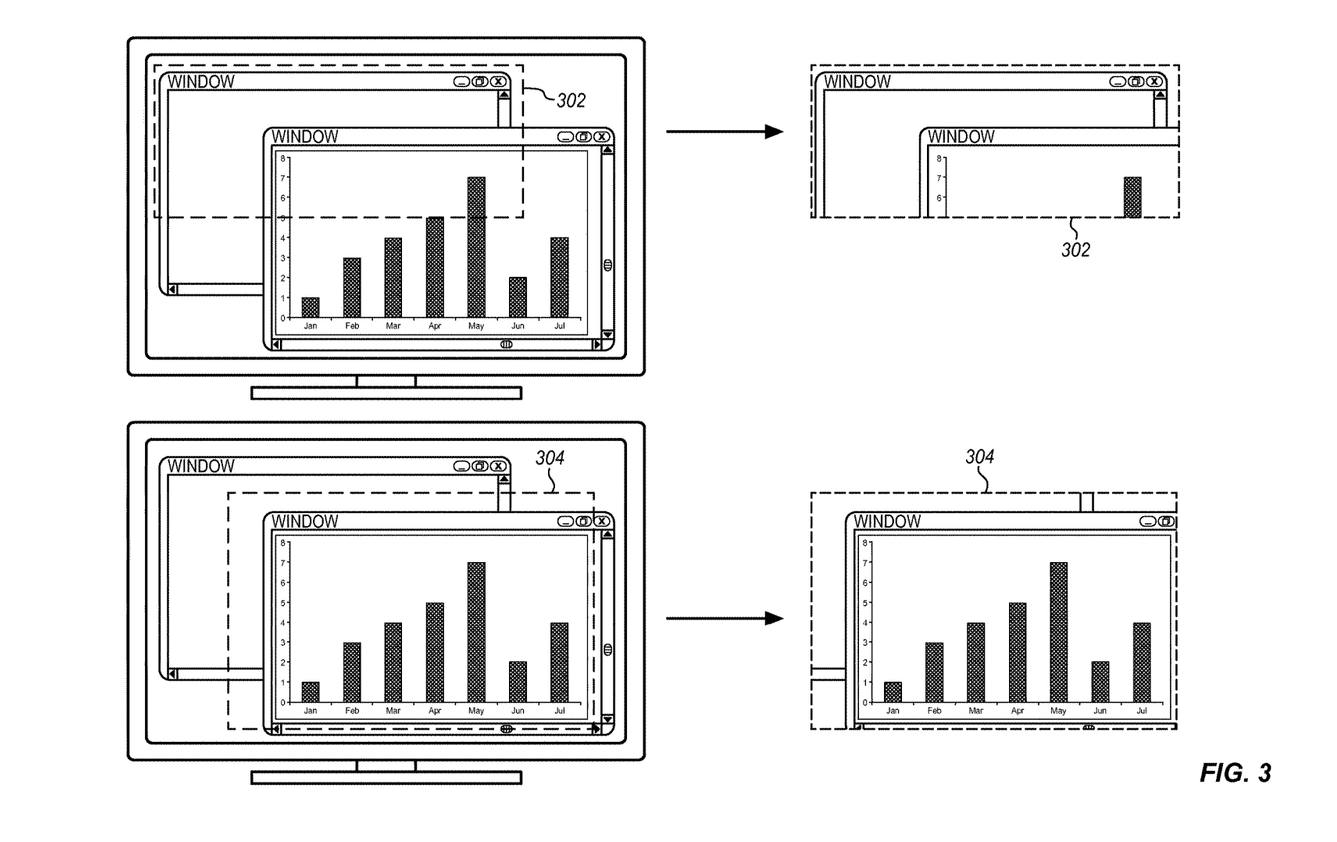
FIG. 3 is a block diagram illustrating a client selecting a screen capture to share with other clients via a server in an exemplary embodiment.

FIG. 3 is a block diagram illustrating a client selecting a screen capture to share with other clients via a server in an exemplary embodiment. According to FIG. 3, software at the client enables a user to select a portion 302 of their screen for use as a shared screen capture. The user may further adjust the location and/or size of selected portion 302 in order to display different visual content to the other meeting attendees. For example, according to FIG. 3, selected portion 302 does not fully include a bar chart shown on the user's display. The user wishes to present the entire bar chart to other meeting attendees, and therefore adjusts selected portion 302 in order to form selected portion 304, which includes the entire bar chart. Selected portion 304, instead of 302, may then be shared with the other meeting attendees. In further embodiments, as the software is running at the client, screen captures are continuously transmitted to the server for sharing with other attendees (e.g., multiple times per second). Thus, other meeting attendees may watch the selected portion change "live" as the user adjusts the portion's size and/or location.

For example, a meeting attendee using a client implemented on a mobile device (e.g., cell phone, tablet, laptop) or any device for that matter may share visual content that includes pictures taken by the device, may share live streaming video from a camera of the device, etc. For clients implemented on devices including touch screens, users can pan and zoom using typical gestures such as pinching and dragging. This allows the client to pan and zoom while sharing in a manner that is both intuitive and convenient. Such touchscreen devices may provide a superior user experience by zooming into the area on which the user wishes to draw or write. However, zoom is not limited to only devices that include touch screens, as in some embodiments zoom functions may be supported by a laptop, desktop, smart television, etc. that use more traditional inputs.

Shared Screen Distribution

Figure 4:
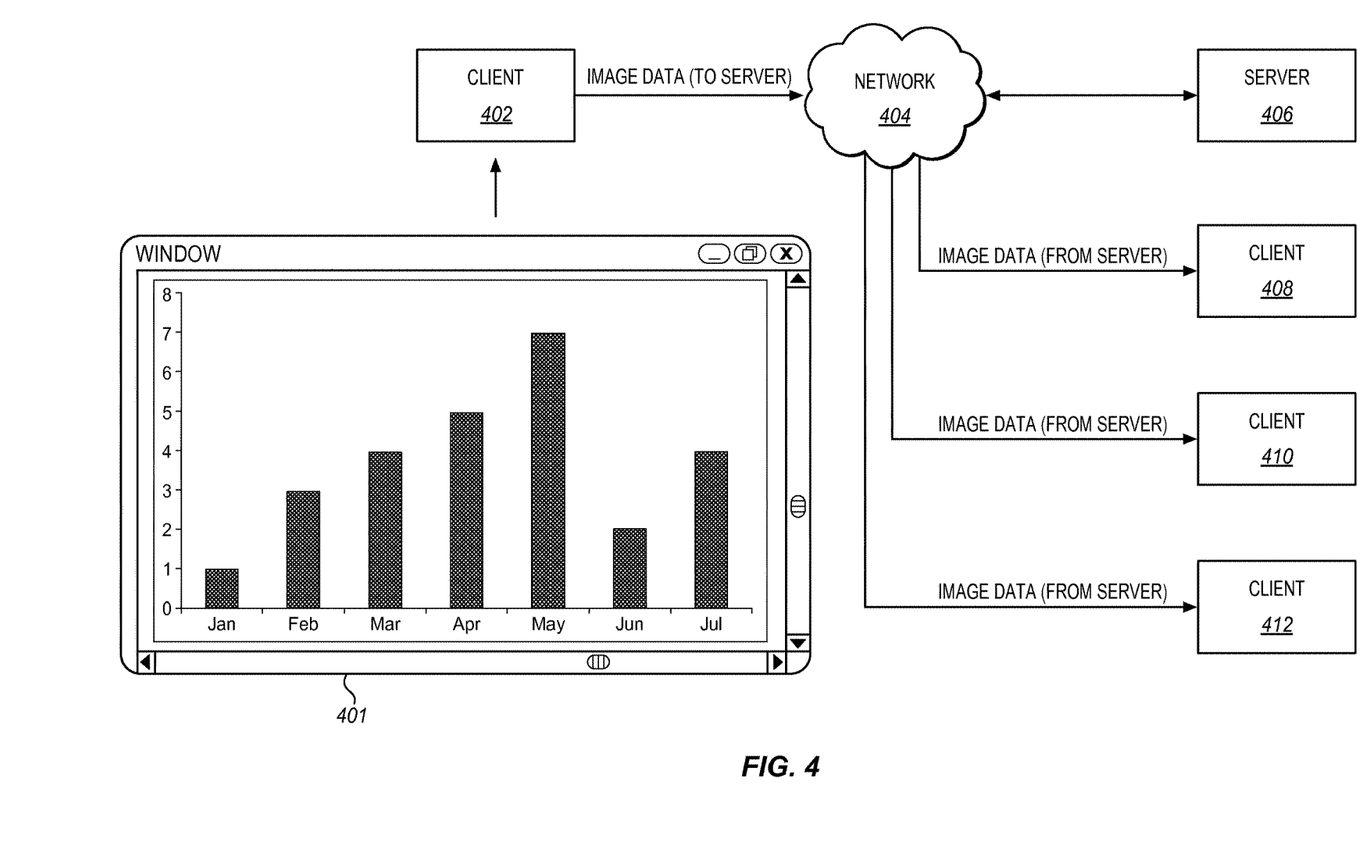
FIG. 4 is a block diagram illustrating distribution of a screen capture from one client to multiple other clients in an exemplary embodiment.

FIG. 4 is a block diagram illustrating distribution of a shared screen capture from one client to multiple other clients in an exemplary embodiment. According to FIG. 4, client 402 sends a JPEG screen capture representing screen 401 to server 406 via network 404. This screen capture is saved at server 406 and added to an undo/redo state in memory of server 406. The undo/redo state may be traversed to track previously performed actions for a meeting. Maintaining the undo/redo state allows for server 406 to manage undo and redo commands relating to the meeting. Additionally, the undo/redo state allows server 406 to provide incoming clients with the current status of the meeting, and also allows incoming clients to utilize the undo/redo state to undo and redo actions, even if those actions were performed before they entered the meeting.

Server 406, upon receiving the screen capture, forwards the screen capture to clients 408-412 via network 404. Upon receiving the shared screen capture, clients 408-412 each update a portion of their displays to reflect the shared screen capture from client 402.

Figure 5:
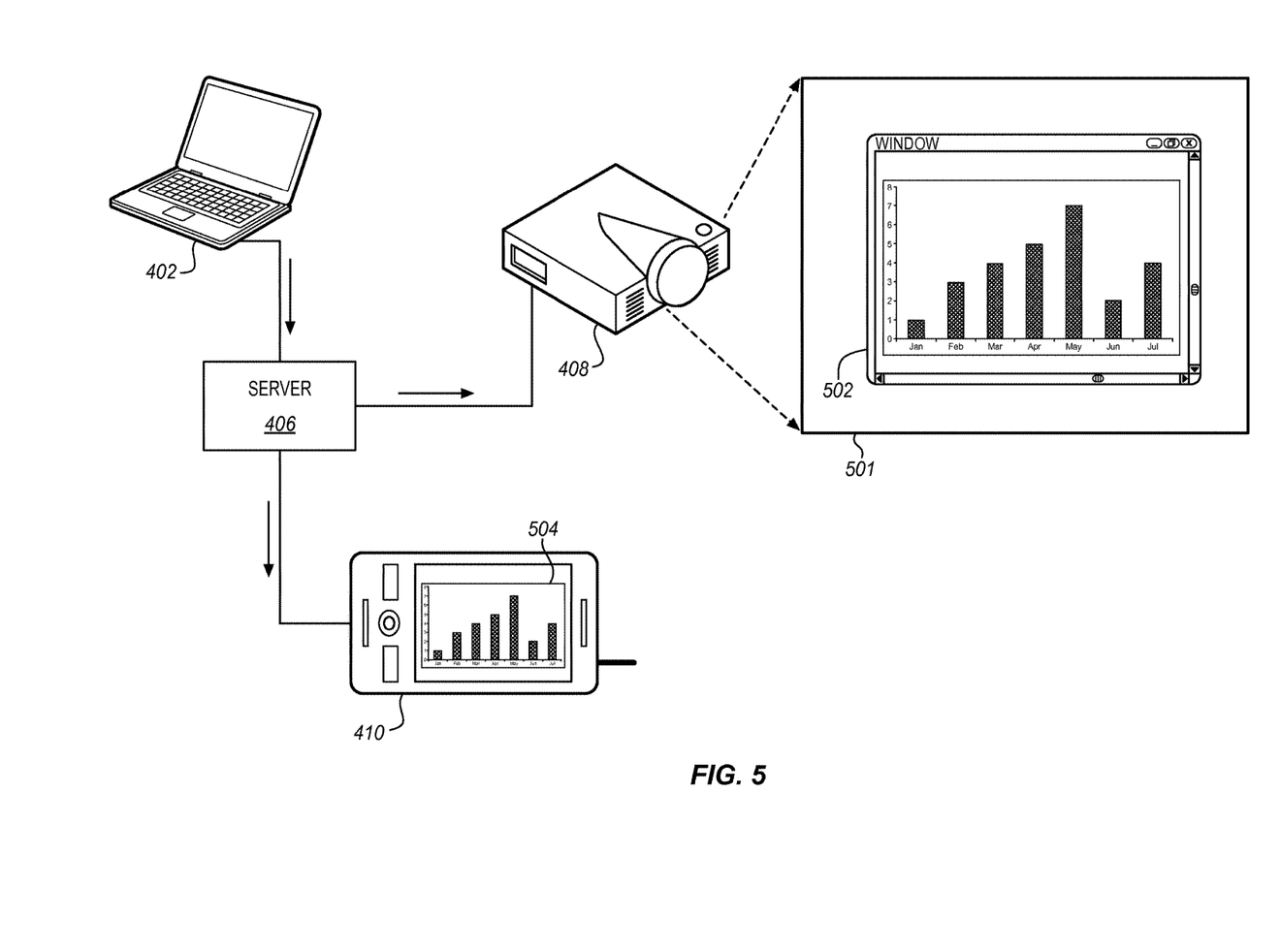
FIG. 5 is a block diagram further illustrating distribution of a screen capture from one client to multiple other clients in an exemplary embodiment.

FIG. 5 is a block diagram further illustrating distribution of a screen from one client to multiple other clients in an exemplary embodiment. Network 404 is not shown in FIG. 5. However, it will be appreciated that server 406 utilizes network 404 in order to receive and distributed shared content between clients 408-412. According to FIG. 5, client 408 comprises a "smart" projector having functions for operating client software that facilitates a meeting. Client 408 projects the received image data within a window 502 projected onto a physically distinct display 501. Further according to FIG. 5, client 410 comprises a smart phone. Because client 410 may have a different aspect ratio and/or resolution than other clients, client 410 may rotate, scale, and/or position received image data at display 504 differently than other clients in order to maximize the size of the viewable area.

Applying Marks to Shared Screen Capture

Figure 6:
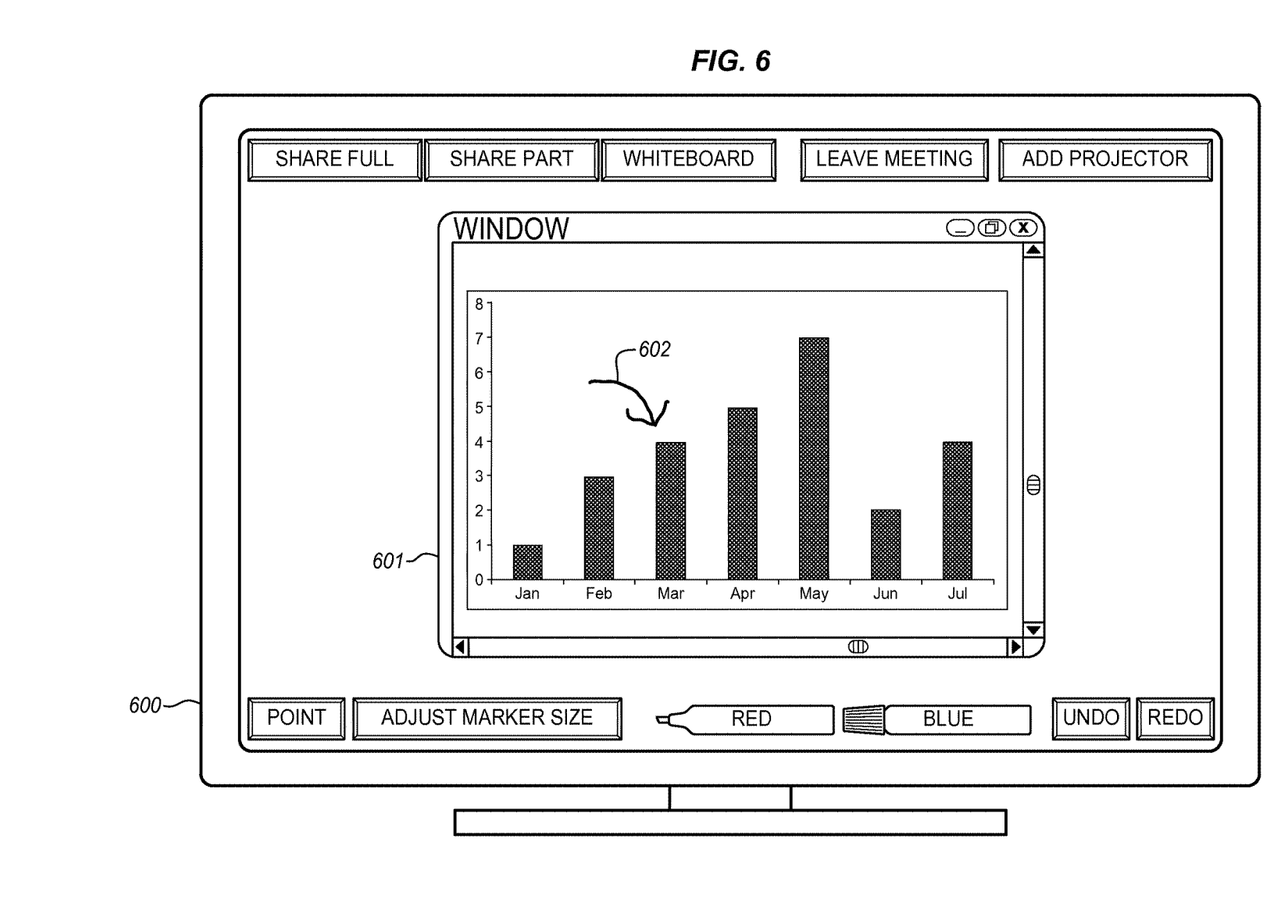
FIG. 6 is a block diagram of a client applying marks to a shared screen capture in an exemplary embodiment.

FIG. 6 is a block diagram of a client applying marks to a shared screen capture in an exemplary embodiment. According to FIG. 6, a client 600 viewing shared screen capture 601 is presented with a number of interface options for interacting with other meeting attendees. These options include replacing shared screen capture 601 as currently shown with a screen capture, either full or partial, taken from client 600. These options are shown in FIG. 6 as "share full" and "share partial." "Share full" allows a user to share their entire screen, while "share partial" shares only a selected portion of a screen as discussed with regard to FIG. 3 above. "Share partial" allows a client 110 to keep part of its desktop private, by not sharing it. Conversely "share partial" also allows a client 110 to emphasize part of its desktop by zooming into a particular area of interest. The partial area being shared is rectangular and can be adjusted on the fly (by using the pointing device) while sharing from clients 110. Personal devices can pan and zoom using typical gestures such as pinching and dragging. In effect, a client 110 can pan and zoom while sharing. In the case of personal devices, their physically smaller screens provide a superior rendering experience by zooming into the area on which the user wishes to draw or write.

The options also include sharing a blank "whiteboard" with other clients that may be marked upon for collaboration. The options further include a "leave meeting" option which requests that server 406 remove client 600 from a list of meeting attendees. An additional option includes "add projector" for adding a projector or similar group display device to the meeting in order to present the shared screen capture to co-located meeting attendees. Among the options for manipulating shared screen capture 601 shown along the bottom of the screen of client 600 in FIG. 6 are the ability to undo and redo previously applied marks and/or shared screen captures, the ability to select a marking tool (e.g., "red" or "blue" marking tools—in FIG. 6 these are rendered in the shape of actual markers), the ability to "adjust marker size" so as to adjust the width of strokes that are applied, and the ability to temporarily "point" to a given location on shared screen capture 601. In a further embodiment, the options include an eraser tool. In a still further embodiment, the options allow a user to clear any strokes added to the shared screen capture, and further include an option that enables a client to stop sharing its screen capture with the other clients.

According to FIG. 6, a red marker has been selected (as indicated by removal of the cap for that marker), and has been used to apply mark 602 (an arrow pointing to a bar on a chart), on shared screen capture 601. Client 600 measures mark 602 as the user draws onto shared screen capture 601, and transmits stroke-based instructions describing the mark to server 406 for broadcast to other clients.

Markup Instruction Distribution

Figures 7, 8:
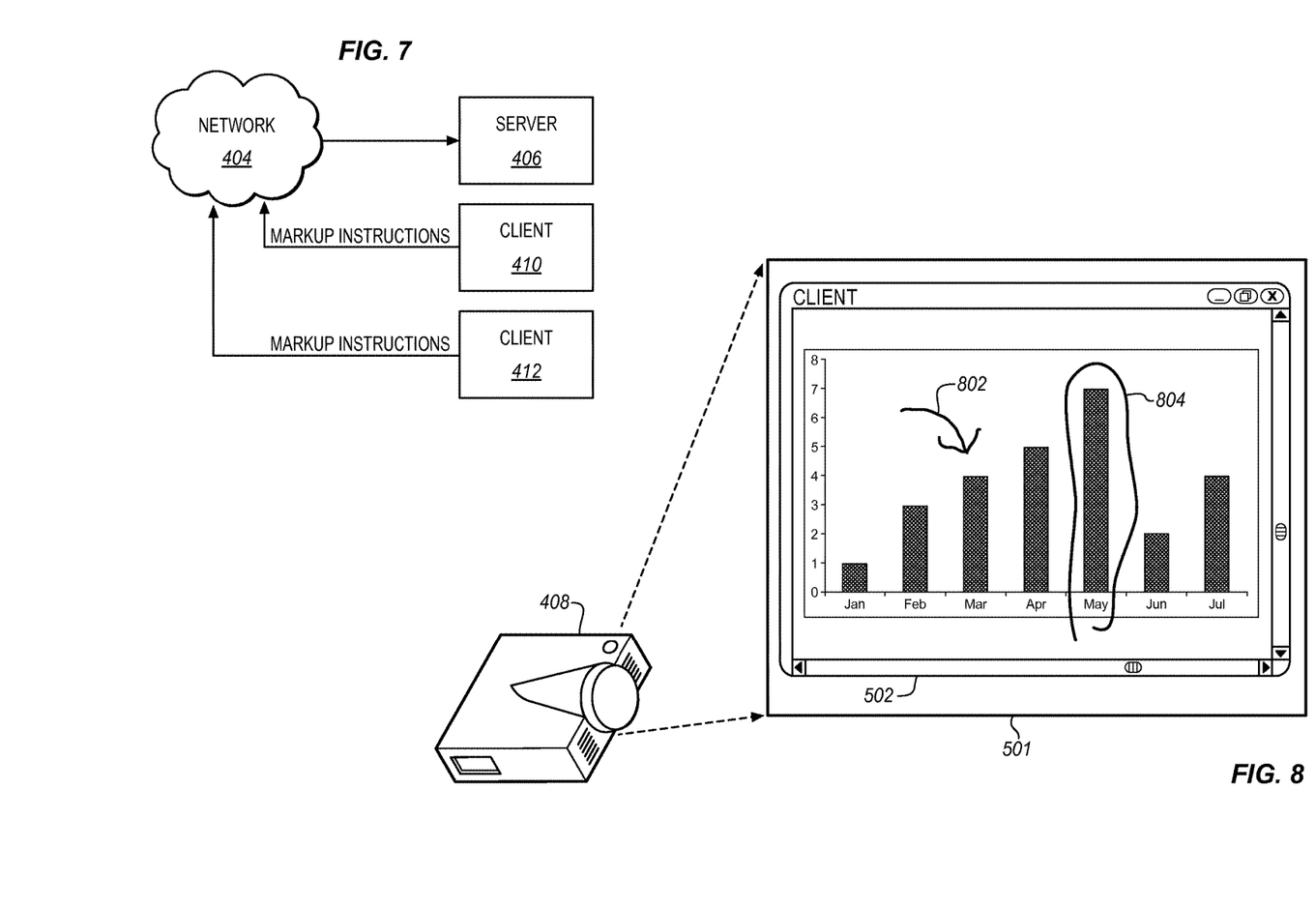
FIG. 7 is a block diagram illustrating the transmission of markup instructions from individual clients to a server in an exemplary embodiment.
FIG. 8 is a block diagram illustrating the presentation of markup instructions distributed from a server to a client in an exemplary embodiment.

FIG. 7 is a block diagram illustrating the transmission of markup instructions from individual clients to a server in an exemplary embodiment. According to FIG. 7, clients 410 and 412 provide, in parallel, markup instructions to server 406 for distribution to the clients which are attending the meeting.

FIG. 8 is a block diagram illustrating the presentation of markup instructions distributed from server 406 to client 408 in an exemplary embodiment. According to FIG. 8, client 408 (here, a projector and associated processors or custom circuitry implementing client software) projects image data representing a shared screen capture onto display 501. Additionally, client 408 projects drawings onto display 501 based upon received markup instructions. For example, mark 802 has been applied by one client, while mark 804 has been applied by another client.

System Components

Figure 9:
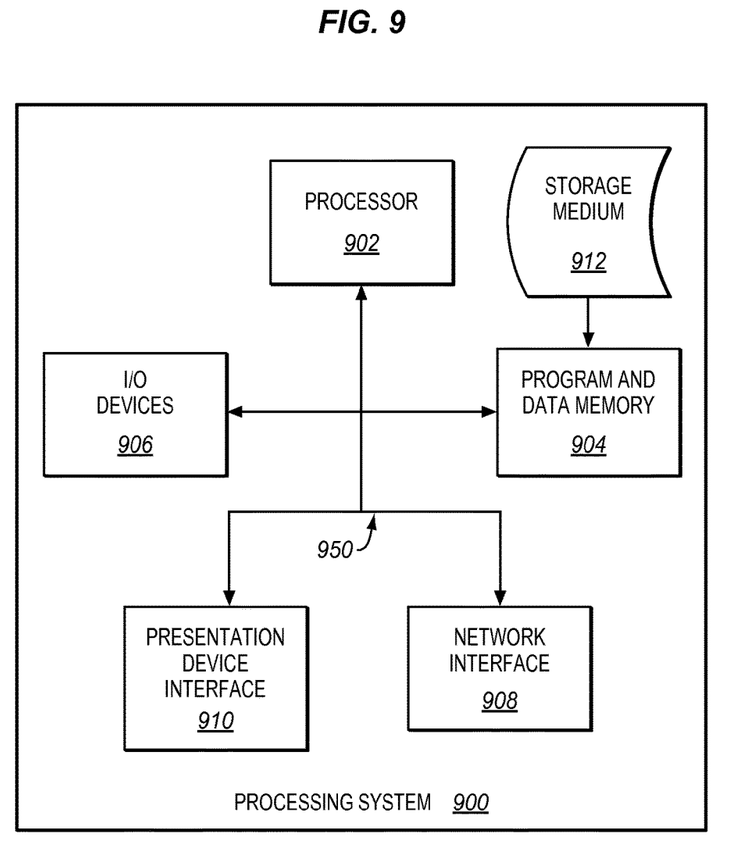
FIG. 9 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of a meeting system to perform the various operations disclosed herein. FIG. 9 illustrates a processing system 900 operable to execute a computer readable medium embodying programmed instructions to perform desired functions in an exemplary embodiment. Processing system 900 is operable to perform the above operations by executing programmed instructions tangibly embodied on computer readable storage medium 912. In this regard, embodiments of the invention can take the form of a computer program accessible via computer-readable medium 912 providing program code for use by a computer or any other instruction execution system. For the purposes of this description, computer readable storage medium 912 can be anything that can contain or store the program for use by the computer.

Computer readable storage medium 912 can be an electronic, magnetic, optical, electromagnetic, infrared, or semiconductor device. Examples of computer readable storage medium 912 include a solid state memory, a magnetic tape, a removable computer diskette, a random access memory (RAM), a read-only memory (ROM), a rigid magnetic disk, and an optical disk. Current examples of optical disks include compact disc—read only memory (CD-ROM), compact disc—read/write (CD-R/W), and DVD.

Processing system 900, being suitable for storing and/or executing the program code, includes at least one processor 902 coupled to program and data memory 904 through a system bus 950. Program and data memory 904 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 906 (including but not limited to keyboards, displays, pointing devices, etc.) can be coupled either directly or through intervening I/O controllers. Network adapter interfaces 908 may also be integrated with the system to enable processing system 900 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 910 may be integrated with the system to interface to one or more presentation devices, such as printing systems and displays for presentation of presentation data generated by processor 902.

Although specific embodiments were described herein, the scope of the invention is not limited to those specific embodiments. The scope of the invention is defined by the following claims and any equivalents thereof.

We claim:

1. A system comprising:
    a server that includes:
        a network interface operable to communicate with clients; and
        a control unit operable to share a screen capture between the clients that is presented at displays of the clients,
        the control unit further operable to receive stroke information from one or more of the clients for marking upon the screen capture, and to distribute the stroke information to the clients, the stroke information directing each client to overlay a stroke atop the screen capture at a display of the client and causing the client to update the client's own copy of an undo or redo ("undo/redo") state, wherein the stroke information comprises a location of a cursor, and further comprises an information selected from the group consisting of: a color, a width, an opacity, and a client that originated the mark,
        the control unit further operable to transmit a command to each client, directing each client to undo an erasing stroke stored in the client's own copy of an undo/redo state, wherein the undo/redo state includes prior stroke information applied to the screen capture, and wherein the erasing stroke erases underlying strokes without erasing any portion of the underlying screen capture; and
    the clients, each client operable to receive the command from the server, to use its own copy of the undo/redo state to undo the erasing stroke, based on information included in its own copy of the undo/redo state describing how the erasing stroke was applied,
    wherein each client is operable to use its own copy of the undo/redo state to undo the erasing stroke regardless of whether the client was present when the erasing stroke was applied,
    wherein the clients each undo a previously applied erasing stroke by popping a first entry at an undo stack and pushing the first entry onto a redo stack,
    wherein the clients each redo a previously applied erasing stroke by applying a second entry at the redo stack to the meeting, popping the second entry from the redo stack, and pushing the second entry onto the undo stack, and
    the undo stack and the redo stack each include shared screen captures, strokes, and clears.

2. The system of claim 1 wherein:
    the control unit is further operable to detect a new client, and to transmit the undo/redo state to the new client to enable the new client to apply undo commands.

3. The system of claim 1 wherein:
    the control unit is further operable to generate the undo/redo state, the undo/redo state comprising multiple entries, each entry describing at least one property selected from a group comprising screen captures and stroke information, wherein each screen capture is stored in the same form as it was originally shared, and the stroke information is for marking upon the screen capture and is stored separately from the screen capture.

4. The system of claim 1 wherein:
    the control unit is further operable to receive the stroke information from one of the clients, identify each remaining client, and distribute the stroke information to each remaining client.

5. The system of claim 1 wherein:
    the control unit is further operable to identify a client that provided the stroke information, and to store information in the undo/redo state that associates the client with the stroke information that was provided.

6. The system of claim 1 wherein:
    the stroke information comprises graphical strokes generated by a drawing tool.

7. The system of claim 1 wherein:
the control unit is further operable to facilitate redo commands relating to the screen capture by storing the screen capture and the stroke information at the undo/redo state as an independent entry within the undo/redo state, associating information indicating the order of the entries of the undo/redo in time, receiving a redo command from a client, identifying an entry in the undo/redo state that was previously undone, and instructing the clients to redo the identified entry in the undo/redo state.

8. A method comprising:
sharing, via a server, a screen capture between clients that is presented at displays of the clients;
receiving stroke information at the server from one or more of the clients for marking upon the screen capture, wherein the stroke information comprises a location of a cursor, and further comprises an information selected from the group consisting of: a color, a width, an opacity, and a client that originated the mark;
distributing the stroke information from the server to the clients, the stroke information directing each client to overlay a stroke atop the screen capture at a display of the client and causing the client to update the client's own copy of an undo or redo ("undo/redo") state;
transmitting a command from the server to each client, directing each client to undo an erasing stroke stored in the client's own copy of an undo/redo state, wherein the undo/redo state includes prior stroke information applied to the screen capture, and wherein the erasing stroke erases underlying strokes without erasing any portion of the underlying screen capture;
receiving the command from the server at each of the clients;
using, via the clients, each client's own copy of the undo/redo state to undo the erasing stroke, based on information included in its own copy of the undo/redo state describing how the erasing stroke was applied;
wherein each client uses its own copy of the undo/redo state to undo the erasing stroke regardless of whether the client was present when the erasing stroke was applied,
wherein each client undoes a previously applied erasing stroke by popping a first entry at an undo stack and pushing the first entry onto a redo stack,
wherein each client redoes a previously applied erasing stroke by applying a second entry at the redo stack to the meeting, popping the second entry from the redo stack, and pushing the second entry onto the undo stack, and
the undo stack and the redo stack each include shared screen captures, strokes, and clears.

9. The method of claim 8 further comprising:
detecting a new client; and
transmitting the undo/redo state to the new client to enable the new client to apply undo commands.

10. The method of claim 8 further comprising:
generating the undo/redo state, the undo/redo state comprising multiple entries, each entry describing at least one property selected from a group comprising screen capture and stroke information, wherein the screen capture is stored in the same form as it was originally shared, and the stroke information is for marking upon the screen capture and is stored separately from the screen capture.

11. The method of claim 8 further comprising:
receiving the stroke information from one of the clients;
identifying each remaining client; and
distributing the stroke information to each remaining client.

12. The method of claim 8 further comprising:
identifying a client that provided the stroke information; and
storing information in the undo/redo state that associates the client with the stroke information.

13. The method of claim 8 wherein:
the stroke information comprises graphical strokes generated by a drawing tool.

14. The method of claim 8 further comprising:
facilitating redo commands relating to the screen capture by:
storing the screen capture and each of the stroke information at the undo/redo state as an independent entry within the undo/redo state;
associating information indicating the order of the entries of the undo/redo state in time;
receiving a redo command from a client;
identifying an entry in the undo/redo state that was previously undone; and
instructing the clients to redo the identified entry in the undo/redo state.

15. A non-transitory computer readable medium embodying programmed instructions which, when executed by a processor, are operable for performing a method comprising:
sharing, via a server, screen capture between clients that is presented at displays of the clients;
receiving stroke information at the server from one or more of the clients for marking upon the screen capture, wherein the stroke information comprises a location of a cursor, and further comprises an information selected from the group consisting of: a color, a width, an opacity, and a client that originated the mark;
distributing the stroke information from the server to the clients, the stroke information directing each client to overlay a stroke atop the screen capture at a display of the client and causing the client to update the client's own copy of an undo or redo ("undo/redo") state;
transmitting a command from the server to each client, directing each client to undo an erasing stroke stored in the client's own copy of an undo/redo state, wherein the undo/redo state includes prior stroke information applied to the screen capture, and wherein the erasing stroke erases underlying strokes without erasing any portion of the underlying screen capture;
receiving the command from the server at each of the clients;
using, via the clients, each client's own copy of the undo/redo state to undo the erasing stroke, based on information included in its own copy of the undo/redo state describing how the erasing stroke was applied;
wherein each client uses its own copy of the undo/redo state to undo the erasing stroke regardless of whether the client was present when the erasing stroke was applied,
wherein each client undoes a previously applied erasing stroke by popping a first entry at an undo stack and pushing the first entry onto a redo stack,
wherein each client redoes a previously applied erasing stroke by applying a second entry at the redo stack to the meeting, popping the second entry from the redo stack, and pushing the second entry onto the undo stack, and the undo stack and the redo stack each include shared screen captures, strokes, and clears.

16. The non-transitory computer readable medium of claim 15 wherein the method further comprises:
    detecting a new client; and
    transmitting the stored undo/redo state to the new client to enable the new client to apply undo commands.

17. The non-transitory computer readable medium of claim 15 wherein the method further comprises:
    generating the undo/redo state, the undo/redo state comprising multiple entries, each entry describing at least one property selected from a group comprising screen capture and stroke information, wherein the screen capture is stored in the same form as it was originally shared, and the stroke information for marking upon the screen capture are stored separately from the screen capture.

18. The system of claim 1, wherein:
    the undo/redo state comprises multiple entries that each correspond with a different point in time, and in response to receiving the command from the control unit, each client accesses locally stored information in a client-side copy of the undo/redo state describing how the erasing stroke was previously applied by the client, and locally undoes the erasing stroke indicated by the undo/redo state without further input from the control unit.

19. The method of claim 8, wherein:
    the undo/redo state comprises multiple entries that each correspond with a different point in time, and in response to receiving the command, each client accesses locally stored information in a client-side copy of the undo/redo state describing how the erasing, stroke was previously applied by the client, and locally undoes the erasing stroke indicated by the undo/redo state without further input from the control unit.

20. The medium of claim 15, wherein:
    the undo/redo state comprises multiple entries that each correspond with a different point in time, and in response to receiving the command, each client accesses locally stored information in a client-side copy of the undo/redo state describing how the erasing stroke was previously applied by the client, and locally undoes the erasing stroke indicated by the undo/redo state without further input from the control unit.

* * * * *